(12) United States Patent
Nagaraja

(10) Patent No.: US 8,488,562 B2
(45) Date of Patent: Jul. 16, 2013

(54) TRANSMISSION POWER CONTROL IN MULTI-HOP NETWORKS

(75) Inventor: Nagendra Nagaraja, Karnataka (IN)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 12/905,334

(22) Filed: Oct. 15, 2010

(65) Prior Publication Data

US 2011/0149769 A1 Jun. 23, 2011

Related U.S. Application Data

(60) Provisional application No. 61/288,144, filed on Dec. 18, 2009.

(51) Int. Cl.
*H04W 4/00* (2009.01)

(52) U.S. Cl.
USPC ........ 370/332; 370/252; 370/310.2; 370/318; 455/13.4; 455/127.1; 455/422.1; 455/522

(58) Field of Classification Search
USPC .............. 370/252, 310.2, 318, 328–339, 349; 455/13.4, 127.1, 422.1, 522
See application file for complete search history.

(56) References Cited

U.S. PATENT DOCUMENTS

| | | | |
|---|---|---|---|
| 6,671,512 B2 * | 12/2003 | Laakso | 455/453 |
| 2007/0184869 A1 | 8/2007 | Koo et al. | |
| 2008/0009243 A1 * | 1/2008 | Hart | 455/67.13 |
| 2008/0076349 A1 | 3/2008 | Hwang et al. | |
| 2008/0165727 A1 * | 7/2008 | Xiaoben et al. | 370/329 |
| 2008/0214182 A1 | 9/2008 | Wang et al. | |
| 2008/0233992 A1 * | 9/2008 | Oteri et al. | 455/522 |
| 2009/0017752 A1 | 1/2009 | Lee | |
| 2009/0104911 A1 * | 4/2009 | Watanabe et al. | 455/436 |
| 2009/0285158 A1 | 11/2009 | Rezaiifar et al. | |
| 2010/0172291 A1 * | 7/2010 | Kim et al. | 370/328 |

OTHER PUBLICATIONS

International Search Report and Written Opinion—PCT/US2010/061155, ISA/EPO—Jul. 6, 2011.

* cited by examiner

*Primary Examiner* — Hoon J Chung
(74) *Attorney, Agent, or Firm* — Tyler J. Overall

(57) ABSTRACT

Systems and methodologies are described that facilitate providing power control for intermediary access points in wireless networks, such as relay nodes. Parameters related to intermediary access point communications can be provided to a serving access point, and the serving access point can generate power adjustment values and related commands based at least in part on the parameters. The parameters can include load on the intermediary access point, signal-to-interference-and-noise ratio (SINR) and/or similar parameters related to communications between the intermediary access points and/or one or more UEs, etc. In addition, end-to-end power control can be provided where intermediary access points report SINR to serving access points allowing serving access points to adjust downlink transmission power.

23 Claims, 13 Drawing Sheets

TRANSMISSION POWER CONTROL IN MULTI-HOP NETWORKS

CROSS-REFERENCE

This application claims the benefit of U.S. Provisional Application Ser. No. 61/288,144, filed Dec. 18, 2009, and entitled "RELAY FORWARD LINK POWER CONTROL IN MULTI-HOP NETWORKS," the entirety of which is incorporated herein by reference.

BACKGROUND

I. Field

The present disclosure relates generally to wireless communications and more specifically to providing power control in multi-hop wireless networks.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc., and can use one or more protocols, such as high-speed uplink packet access (HSUPA), single carrier HSUPA (SC-HSUPA), dual carrier HSUPA (DC-HSUPA), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

In addition, one or more relay nodes can be provided for one or more access points to boost power at the cell edge. In this regard, for example, the relay nodes can repeat downlink transmissions from the one or more access points to one or more mobile devices. The relay nodes can be layer 1 (L1) and/or layer 2 (L2)/layer 3 (L3) relay nodes, and can thus broadcast access point communications as received over similar resources to improve hearability of access point transmissions, establish resources with the access points and mobile devices to facilitate communications therebetween, and/or the like. In either case, for example, the relay nodes can cause co-channel interference with the access points (and/or among relay nodes) where similar resources are utilized to forward access point communications.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating end-to-end power control for access points in a multi-hop wireless network to mitigate co-channel interference. In one example, an access point served by an upstream access point can provide one or more parameters regarding a load on the access point. The upstream access point can obtain the one or more parameters and issue a power control command to the access point based at least in part on the one or more parameters, thus controlling downlink power of the access point. In addition, for example, one or more devices communicating with the access point can provide a signal-to-interference-and-noise ratio (SINR), or similar metric related to communicating with the access point, to the upstream access point (e.g., via the access point or otherwise). In this example, the upstream access point can additionally issue a power control command to the access point based at least in part on the SINR or similar metric. Moreover, for example, the upstream access point can control its own downlink power based at least in part on the one or more parameters regarding load on the access point and/or the SINR or other metrics of the one or more devices to provide end-to-end power control.

According to an aspect, a method is provided that includes receiving one or more parameters related to one or more UEs communicating with a relay node and determining a power adjustment value for the relay node based at least in part on the one or more parameters. The method further includes transmitting a power command including the power adjustment value to the relay node.

Another aspect relates to a wireless communications apparatus. The wireless communications apparatus can include at least one processor configured to obtain one or more parameters for communications between one or more UEs and a relay node and compute a power adjustment value for the relay node based at least in part on the one or more parameters. The at least one processor is further configured to transmit the power adjustment value to the relay node. The wireless communications apparatus also comprises a memory coupled to the at least one processor.

Yet another aspect relates to an apparatus. The apparatus includes means for receiving one or more parameters related to one or more UEs communicating with a relay node and means for determining a power adjustment value for the relay node based at least in part on the one or more parameters. The apparatus also includes means for transmitting a power command including the power adjustment value to the relay node.

Still another aspect relates to a computer program product, which can have a computer-readable medium including code for causing at least one computer to obtain one or more parameters for communications between one or more UEs and a relay node and code for causing the at least one computer to generate a power adjustment value for the relay node based at least in part on the one or more parameters. The computer-readable medium can also comprise code for causing the at least one computer to transmit the power adjustment value to the relay node.

Moreover, an additional aspect relates to an apparatus including a communication parameter receiving component that obtains one or more parameters related to one or more UEs communicating with a relay node and a power adjustment determining component that generates a power adjustment value for the relay node based at least in part on the one or more parameters. The apparatus can further include a power command issuing component that transmits a power command including the power adjustment value to the relay node.

According to another aspect, a method is provided that includes providing one or more parameters to an access point related to communicating with one or more UEs and receiving a power adjustment value from the access point in response to the one or more parameters. The method also includes adjusting a downlink transmission power according to the power adjustment value.

Another aspect relates to a wireless communications apparatus. The wireless communications apparatus can include at least one processor configured to communicate one or more parameters to an access point related to communicating with one or more UEs and obtain a power adjustment value from the access point based at least in part on the one or more parameters. The at least one processor is further configured to modify a downlink transmission power according to the power adjustment value. The wireless communications apparatus also comprises a memory coupled to the at least one processor.

Yet another aspect relates to an apparatus. The apparatus includes means for providing one or more parameters to an access point related to communicating with one or more UEs and means for receiving a power adjustment value from the access point based at least in part on the one or more parameters. The apparatus also includes means for adjusting downlink transmission power according to the power adjustment value.

Still another aspect relates to a computer program product, which can have a computer-readable medium including code for causing at least one computer to communicate one or more parameters to an access point related to communicating with one or more UEs and code for causing the at least one computer to obtain a power adjustment value from the access point based at least in part on the one or more parameters. The computer-readable medium can also comprise code for causing the at least one computer to modify a downlink transmission power according to the power adjustment value.

Moreover, an additional aspect relates to a component that provides one or more parameters to an access point related to communicating with one or more UEs and a power adjustment receiving component that obtains a power adjustment value from the access point based at least in part on the one or more parameters. The apparatus can further include a power adjusting component that modifies a downlink transmission power according to the power adjustment value.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
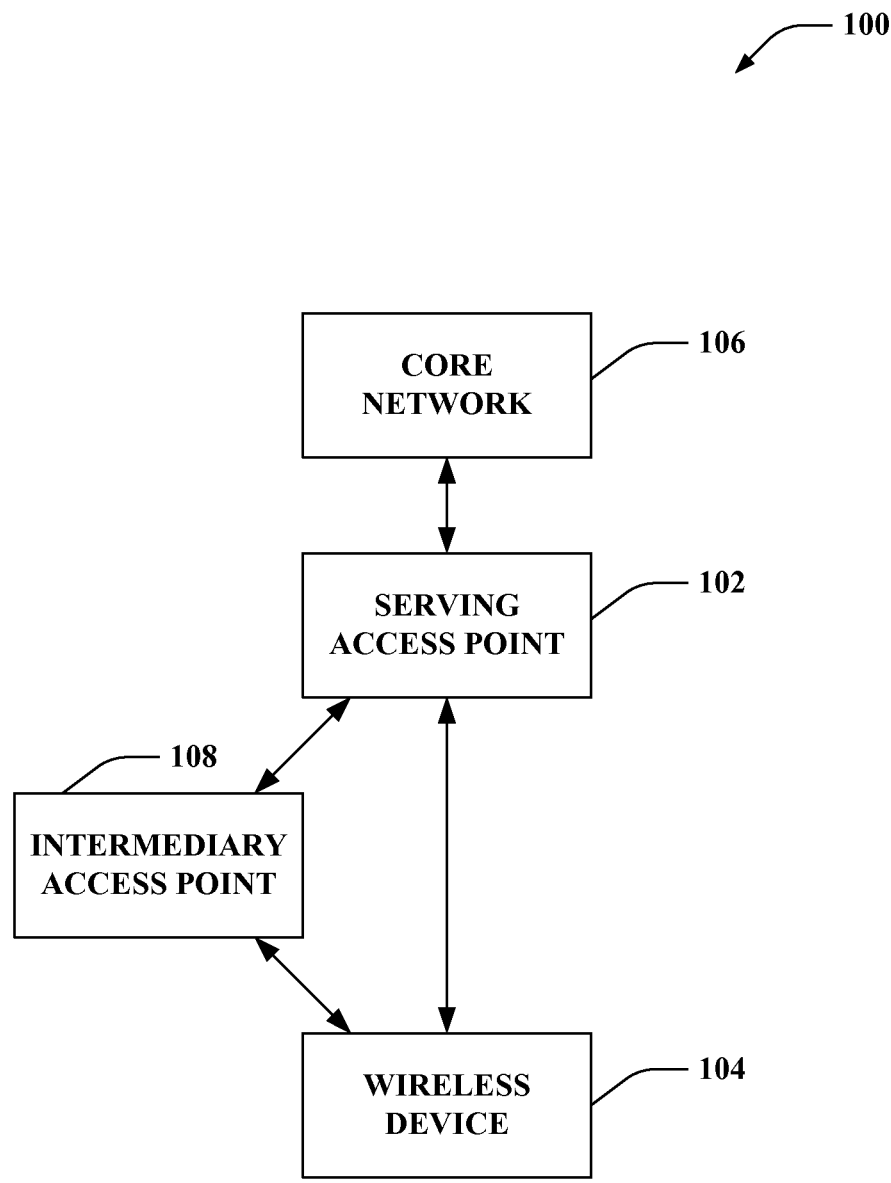
FIG. 1 is a block diagram of a system for controlling power of an intermediary access point.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example system 100 that facilitates providing wireless network access to one or more devices through a plurality of access points. System 100 includes a serving access point 102 that provides a wireless device 104 with access to a core network 106. For example, serving access point 102 can provide wireless network access to wireless device 104 directly and/or through an intermediary access point 108. Serving access point 102 can be substantially any device that provides access to one or more network components, such as a macrocell access point, femtocell or picocell access point, eNB, mobile base station, relay node, and/or the like. Wireless device 104 can be substantially any device that receives access to a wireless network, such as a mobile device, UE, modem (or other tethered device). Intermediary access point 108 can be substantially any device that facilitates access between a device and an access point, such as a relay node, and/or the like. Moreover, though one intermediary access point 108 is depicted, it is to be appreciated that multiple intermediary access points can be present between wireless device 104 and serving access point 102.

According to an example, intermediary access point 108 can be a relay node that communicates data from serving access point 102 to wireless device 104, and vice versa. Intermediary access point 108 can be a layer 1 (L1), layer 2 (L2)/layer 3 (L3), and/or similar relay nodes. Thus, for example, intermediary access point 108 can receive communications transmitted by serving access point 102 and transmit the received communications to provide relay node functionality. In this example, wireless device 104 can receive the communications from both serving access point 102 and intermediary access point 108 to improve hearability of the communications. In another example, thus, wireless device 104 can establish resources with intermediary access point 108 (in addition or alternatively to serving access point 102) for communicating data from serving access point 102.

In either configuration, for example, intermediary access point 108 can cause co-channel interference with serving access point 102 (and/or one or more other intermediary access points). Serving access point 102 and/or intermediary access point 108 can communicate with wireless device 104 over one or more logical channels (e.g., control channels, data channels, etc.), which can be defined as one or more portions of frequency over time. The logical channels can be defined, for example, in FDMA, TDMA, CDMA, OFDMA, or similar networks according to a network specification (e.g., 3GPP LTE, WiMAX, etc.). Thus, since intermediary access point 108 is communicating transmissions from serving access point 102, it can interfere therewith over a corresponding logical channel in some cases at least since it utilizes similar resources in communicating the transmissions.

To mitigate such interference, serving access point 102 can control downlink transmit power of intermediary access point 108 by issuing power control commands thereto. In one example, intermediary access point 108 can provide information regarding a load on the intermediary access point 108 to serving access point 102. For example, the information regarding the load can specify a number of wireless devices served by intermediary access point 108, a number of resources utilized by the wireless devices (e.g., as a percentage of total available resources at intermediary access point 108 or otherwise), and/or the like. Based at least in part on this information, for example, serving access point 102 can adjust power of intermediary access point 108 by sending a power control command to facilitate handling the load while mitigating interference.

In another example, wireless device 104 can determine a signal-to-interference-and-noise ratio (SINR) or similar communication metric (e.g., interference over thermal (IoT), etc.) related to communicating with intermediary access point 108 and can transmit the communication metric to serving access point 102 (e.g., through intermediary access point 108 or otherwise). Serving access point 102 can additionally or alternatively adjust the downlink transmit power of intermediary access point 108 based at least in part on the communication metric from wireless device 104. In addition, it is to be appreciated that serving access point 102 can adjust its downlink transmission power based at least in part on the load information or communication metrics. Thus, serving access point 102 can handle end-to-end power control relating to a number of intermediary access points to mitigate co-channel interference. In this regard, intermediary access points need not perform power control or measure interference from other access points. In addition, though aspects above and herein are described for downlink power and communications, it is to be appreciated that similar concepts can be utilized to provide power control for the uplink.

Figure 2:
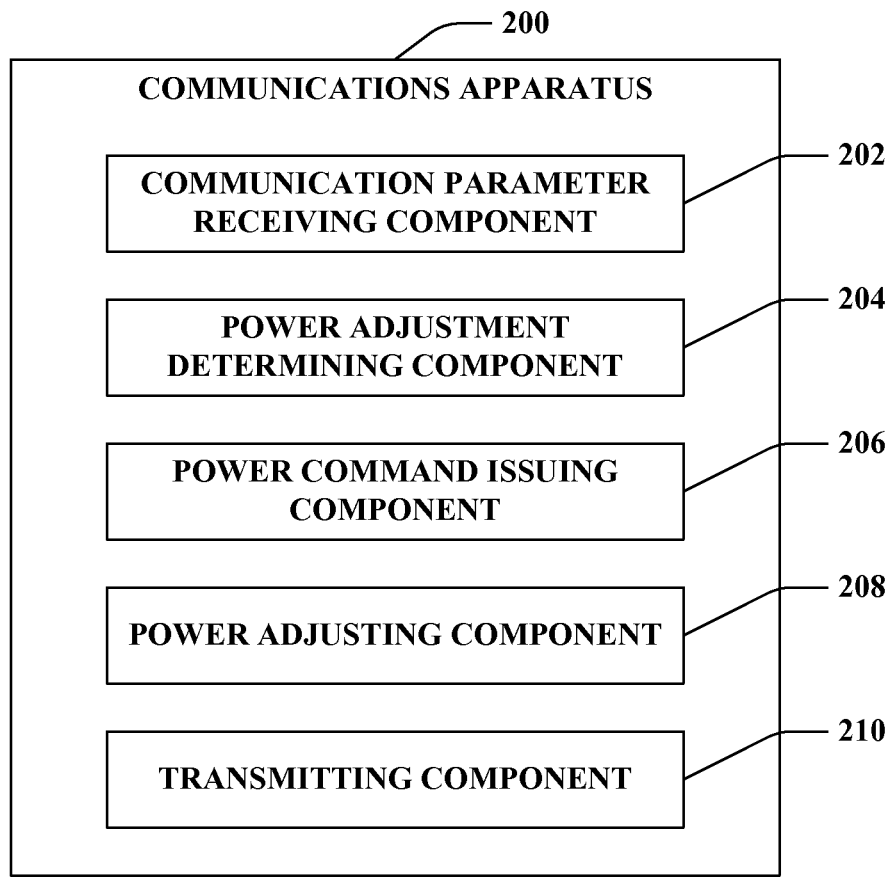
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, access point, a portion thereof, or substantially any device that can transmit signals in a wireless network. The communications apparatus 200 can include a communication parameter receiving component 202 that obtains one or more communications parameters from a wireless device, intermediary access point (such as a relay node), and/or the like (not shown), and a power adjustment determining component 204 that generates a power adjustment value based at least in part on the one or more communication parameters. Communications apparatus 200 additionally includes a power command issuing component 206 that generates and transmits a power adjustment command to an intermediary access point based at least in part on the power adjustment value, a power adjusting component 208 that adjusts a local power based at least in part on the power adjustment value, and a transmitting component 210 that communicates with one or more devices in a wireless network.

According to an example, communication parameter receiving component 202 can obtain one or more parameters related to an intermediary access point. As described, for example, the one or more parameters can correspond to a load on the intermediary access point, a SINR or similar communication parameter related to communicating with the intermediary access point, a SINR of the intermediary access point related to communicating with communications apparatus 200, and/or the like. Power adjustment determining component 204 can compute a power adjustment value based at least in part on the one or more parameters. For example, where a load on the intermediary access point is above a threshold load, power adjustment determining component 204 computes an increased power adjustment value to facilitate serving the load at the intermediary access point. Similarly, where the load on the intermediary access point is below a threshold level, power adjustment determining component 204 can compute a decreased power adjustment value to lower power at the intermediary access point (e.g., to mitigate co-channel interference where extra power is not needed).

In addition, for example, power adjustment determining component 204 can compute a power adjustment value based at least in part on SINR of one or more devices communicating with the intermediary access point. Thus, for example, where one or more SINRs are below a threshold (e.g., and/or an average of the SINRs is below a threshold average), power adjustment determining component 204 can compute a power adjustment value to increase power at the intermediary access point. In one example, the power adjustment value can be proportional to a desired increase in SINR, for example. Similarly, power adjustment determining component 204 can compute a decreased power adjustment value for SINR above a threshold level to conserve power and mitigate co-channel interference. In either case, power command issuing component 206 can transmit the power adjustment value to the intermediary access point (e.g., as part of a data transmission or in a separate message). Moreover, it is to be appreciated that power adjustment determining component 204 can compute the power adjustment value based on both the load and SINR information, in one example.

In another example, power adjustment determining component 204 can formulate a power adjustment value for communications apparatus 200 based at least in part on a SINR related to communications between communications apparatus 200 and the intermediary access point. For example, where the intermediary access point reports a SINR below a threshold, power adjustment determining component 204 can compute an increase power adjustment value. Similarly, power adjustment determining component 204 can formulate a decreased power adjustment value where the SINR is above a threshold level. In either case, power adjusting component 208 can modify a transmit power of communications apparatus 200 based on the power adjustment value, and transmitting component 210 can subsequently transmit communications to the intermediary access point and/or one or more devices at the adjusted power.

Figure 3:
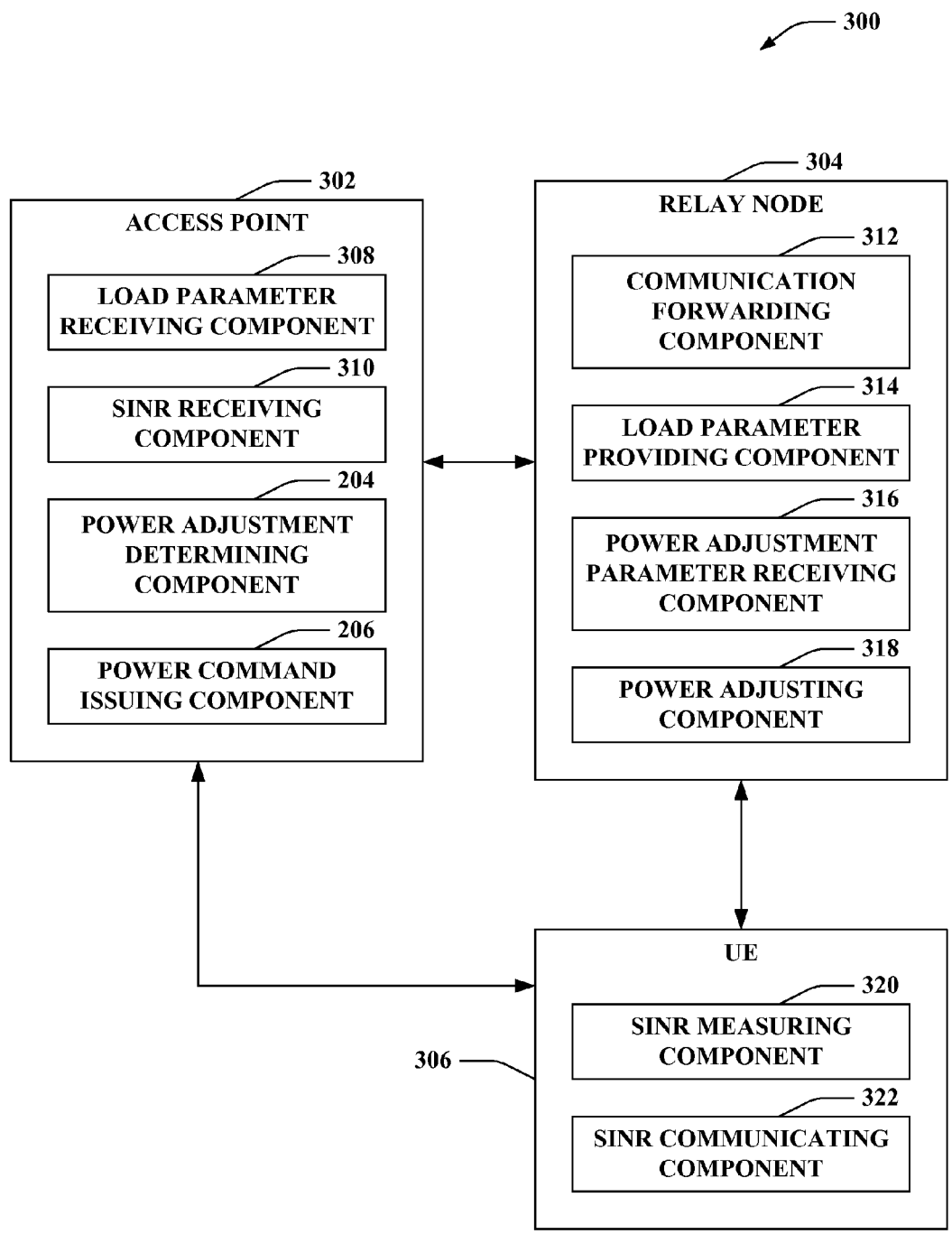
FIG. 3 illustrates an example wireless communication system for providing power adjustment values to a relay node.

Now referring to FIG. 3, illustrated is a wireless communications system 300 that facilitates controlling power among various access points in a wireless network. System 300 includes an access point 302 that provides one or more relay nodes or other intermediary access points, such as relay node 304, with access to a core network (not shown). Similarly, relay node 304 can provide one or more disparate relay nodes or UEs, such as UE 306, with access to the core network via access point 302, as described. Moreover, access point 302 can be a macrocell access point, femtocell access point, picocell access point, mobile base station, and/or the like. Relay node 304 can similarly be an access point, a mobile or stationary relay node that communicates with access point 302 over a wireless or wired backhaul, and/or the like, as described. In addition, for example, one or more intermediary access points can be present between access point 302 and relay node 304 and can comprise components thereof to facilitate similar functionality to that described below.

Access point 302 can comprise a load parameter receiving component 308 that obtains one or more parameters regarding load on a relay node and a SINR receiving component 310 that obtains SINR parameters corresponding to one or more UEs communicating with the relay node. Access point 302 also includes a power adjustment determining component 204 that determines a power adjustment value for downlink transmission power of the relay node based at least in part on the one or more parameters regarding load thereon and/or the SINR parameters and a power command issuing component 206 that provides the power adjustment value to the relay node.

Relay node 304 can include a communication forwarding component 312 that obtains signals from access point 302 and forwards the signals (e.g., or data in the signals) to UE 306, and/or vice versa, as well as a load parameter providing component 314 that can measure and communicate one or more parameters related to load on relay node 304. Relay node 304 also includes a power adjustment parameter receiving component 316 that obtains a power adjustment value and a power adjusting component 318 that modifies downlink transmission power of relay node 304. UE 306 can comprise a SINR measuring component 320 that determines a SINR related to communicating with a relay node and a SINR communicating component 322 that provides the SINR to an access point (e.g., directly and/or via the relay node).

According to an example, as described, relay node 304 can facilitate communicating between access point 302 and UE 306 (e.g., to increase signal strength at the cell edge). As described, relay node 304 can be an L1, L2/L3, or other relay node, and can thus facilitate communicating by receiving and communicating signals transmitted by access point 302, and/or doing so over a connection established with UE 306. Moreover, in one example, relay node 304 can communicate signals from UE 306 to access point 302. In either case, communication forwarding component 312 can obtain communications from access point 302 and transmit the communications to 306 and/or vice versa. Load parameter providing component 314 can determine a load on relay node 304 and communicate one or more related parameters to access point 302 (e.g., based on a request or other command from access point 302, based on a timer, etc.). For example, load parameter providing component 314 can determine the load based at least in part on a number of UEs communicating with relay node 304, a number of resources allocated to the UEs (e.g., and/or a capacity of resources utilized), etc.

Load parameter receiving component 308 can obtain the one or more parameters related to load from relay node 304. Based at least in part on the one or more parameters, power adjustment determining component 204 can formulate a power adjustment value for relay node 304. As described, for example, if the load is above or below a threshold level, power adjustment determining component 204 can generate an increased or decreased power adjustment value. In addition, for example, power adjustment determining component 204 can compute the power adjustment value in proportion to the load (e.g. larger reported loads can receive larger power increases). Moreover, for example, power adjustment determining component 204 can compare the load to similar load parameters of one or more disparate relay nodes to compute a comparative power adjustment value. In any case, power command issuing component 206 can transmit a power command to relay node 304 including the power adjustment value (e.g., along with downlink data or otherwise). Power adjustment parameter receiving component 316 can obtain the power adjustment value, and power adjusting component 318 can increase or decrease a downlink transmission power based at least in part on the power adjustment value.

Moreover, for example, power adjustment determining component 204 can additionally or alternatively generate a power adjustment value based at least in part on SINR information relating to UE 306. In this example, SINR measuring component 320 can determine a SINR related to communicating with relay node 304 (e.g., based at least in part on a request from access point 302, a timer, and/or the like). SINR communicating component 322 can transmit the SINR to access point 302 (e.g., directly and/or via relay node 304, in which case communication forwarding component 312 can obtain the SINR or related parameters and forward to access point 302). SINR receiving component 310 can receive the SINR or related parameters from UE 306, whether directly or from relay node 304. Power adjustment determining component 204 can determine a power adjustment value based at least in part on comparing the SINR or related parameters to one or more threshold values (e.g., SINR below a threshold corresponds to an increased power adjustment value or decreased value where SINR is above a threshold SINR). In addition, as described, power adjustment determining component 204 can generate a power adjustment value proportional to the SINR to attempt to raise the SINR to a desired value, or by averaging the SINR with one or more SINRs of disparate UEs communicating with relay node 304 (e.g., and comparing the averaged SINR to a threshold SINR).

Furthermore, in another example, power adjustment determining component 204 can generate the power adjustment value by comparing the SINR to SINRs of other devices communicating with relay node 304 or one or more disparate relay nodes. Thus, for example, where UE 306 has SINR below that of UEs communicating with other relay nodes, power adjustment determining component 204 can determine an increased power adjustment value for relay node 304 (and/or a decreased power adjustment value for the other relay nodes). In addition, for example, power adjustment determining component 204 can evaluate SINR of more than one UE communicating with relay node 304 to determine a power adjustment value. Thus, for example, if many UEs communicating with relay node 304 are experiencing low SINR, power adjustment determining component 204 can decide to compute an increased power adjustment value for relay node 304. As described above, power command issuing component 206 can transmit the power adjustment value to relay node 304. Power adjustment parameter receiving component 316 can obtain the power adjustment value, and power adjusting component 318 can modify downlink transmission power according to the power adjustment value. Thus, in any case, inner-loop power control is provided for the relay node 304.

Figure 4:
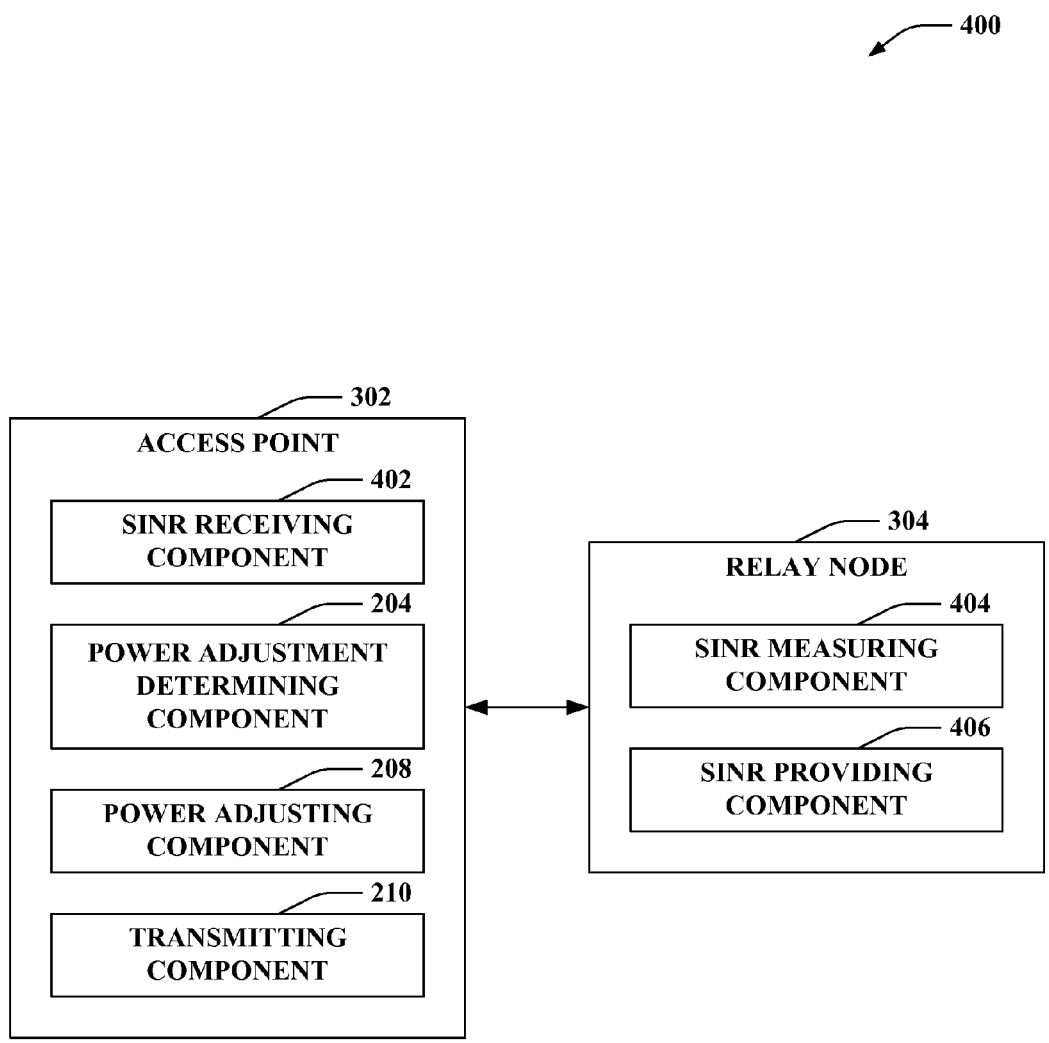
FIG. 4 illustrates an example wireless communication system for adjusting transmission power based on parameters received from a relay node.

Turning to FIG. 4, illustrated is a wireless communications system 400 that facilitates controlling power based at least in part on parameters received from access points in a wireless network. System 400 includes an access point 302 that provides one or more relay nodes or other intermediary access points, such as relay node 304, with access to a core network (not shown). Similarly, relay node 304 can provide one or more disparate relay nodes or UEs (not shown) with access to the core network via access point 302, as described. Moreover, access point 302 can be a macrocell access point, femtocell access point, picocell access point, mobile base station, and/or the like. Relay node 304 can similarly be an access point, a mobile or stationary relay node that communicates with access point 302 over a wireless or wired backhaul, and/or the like, as described. In addition, for example, one or more intermediary access points can be present between access point 302 and relay node 304 and can comprise components thereof to facilitate similar functionality to that described below.

Access point 302 can comprise a SINR receiving component 402 that obtains SINR parameters corresponding to one or more relay nodes and a power adjustment determining component 204 that generates a power adjustment value for downlink transmission power of the access point 302 based at least in part on the SINR parameters. Access point 302 additionally includes a power adjusting component 208 that modifies downlink transmission power of access point 302 based at least in part on the power adjustment value, and a transmitting component 210 that communicates one or more signals using the modified downlink transmission power. Relay node 304 can comprise a SINR measuring component 404 that determines a SINR related to communicating with an access point and a SINR providing component 406 that communicates the SINR to the access point.

According to an example, as described, relay node 304 can facilitate communicating between access point 302 and one or more additional relay nodes or UEs (e.g., to increase signal strength at the cell edge). As described, relay node 304 can be an L1, L2/L3, or other relay node, and can thus facilitate communicating by receiving and communicating signals transmitted by access point 302, and/or doing so over a connection established with a UE. Moreover, as described above, relay node 304 can provide communication metrics to access point 302 to facilitate receiving a power control command therefrom. In addition, SINR measuring component 404 can determine a SINR or one or more parameters related to communicating with access point 302, and SINR providing component 406 can transmit the SINR to access point 302. In this regard, access point can modify its downlink transmission power as well.

SINR receiving component 402 can obtain the SINR from relay node 304. Power adjustment determining component 204 can compute a power adjustment value based at least in part on the SINR (e.g., an increased power adjustment value where the SINR is below a threshold level or decreased where SINR is above a threshold level). In addition, for example power adjustment determining component 204 can compute a power adjustment value based at least in part on comparing the SINR to SINRs of other relay nodes communicating with access point 302. Moreover, for example, power adjustment determining component 204 can compute the power adjustment value so as not to cause co-channel interference to relay node 304 or one or more disparate relay nodes. In any case, power adjusting component 208 can increase or decrease downlink transmission power according to the SINR, and transmitting component 210 can use the modified downlink transmission power in communicating with relay node 304. In addition, it is to be appreciated that different downlink transmission powers can be computed and utilized for communicating with different relay nodes during different time periods, in one example. Moreover, for example, it is to be appreciated that adjusting access point 302 downlink transmission power based at least in part on SINR of one or more relay nodes can be utilized in conjunction with adjusting relay node power based on load and/or device SINR parameters to provide end-to-end power control. In any case, thus, closed-loop power control is provided for access point 302.

Figure 5:
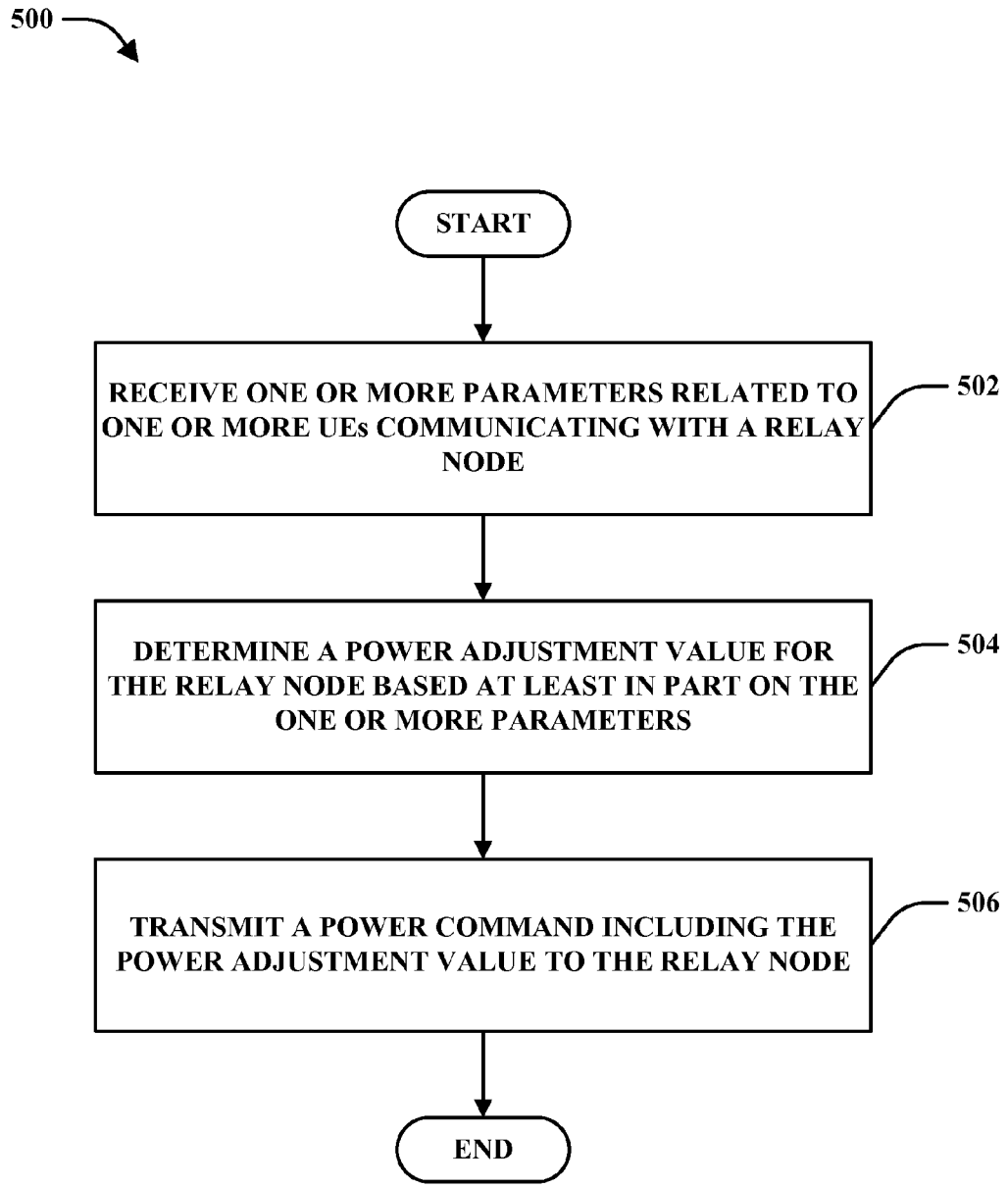
FIG. 5 is a flow diagram of an example methodology that transmits a power adjustment value to a relay node based on received communication parameters.
Figure 6:
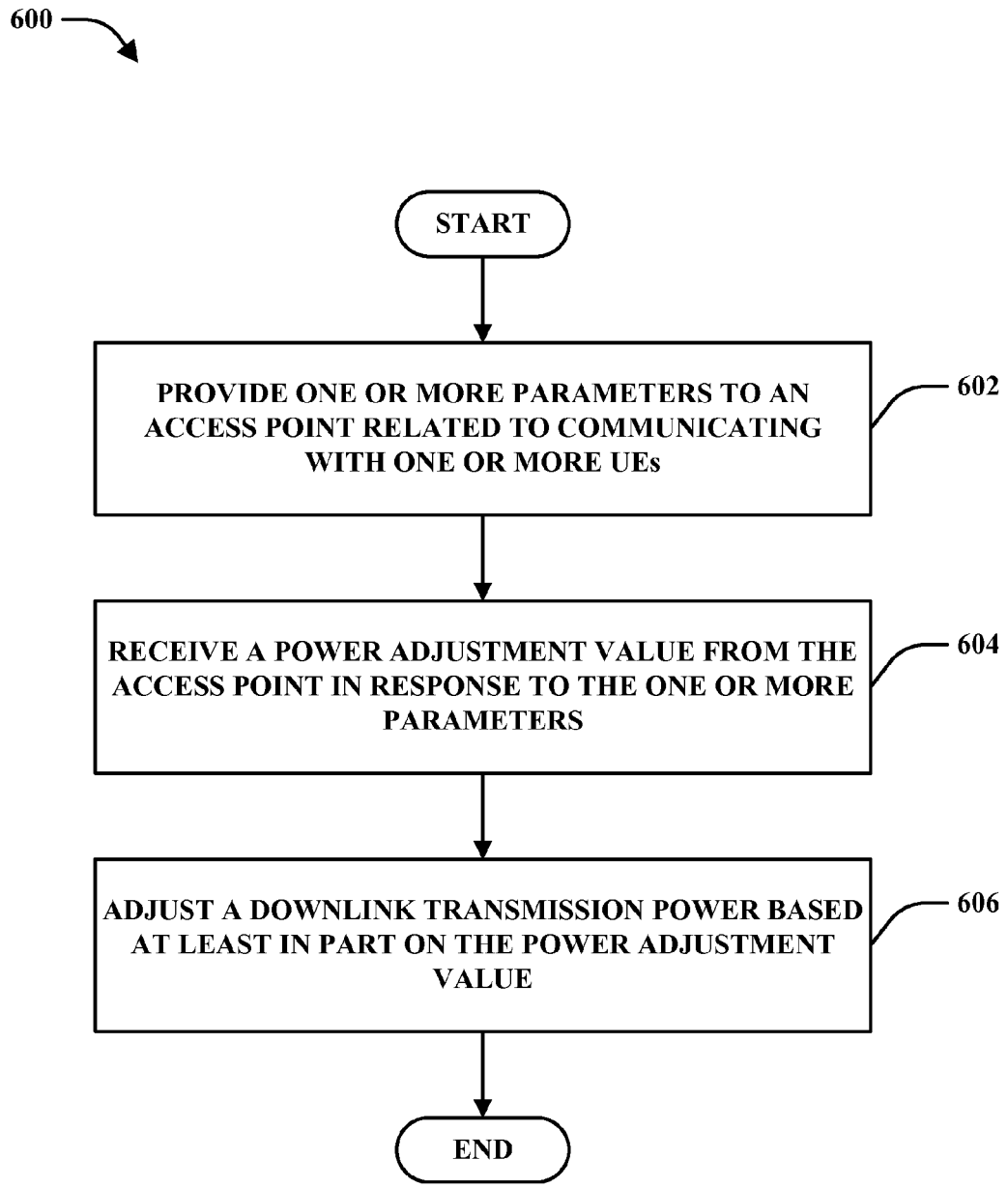
FIG. 6 is a flow diagram of an example methodology that adjusts downlink transmission power based on a received power adjustment value.
Figure 7:
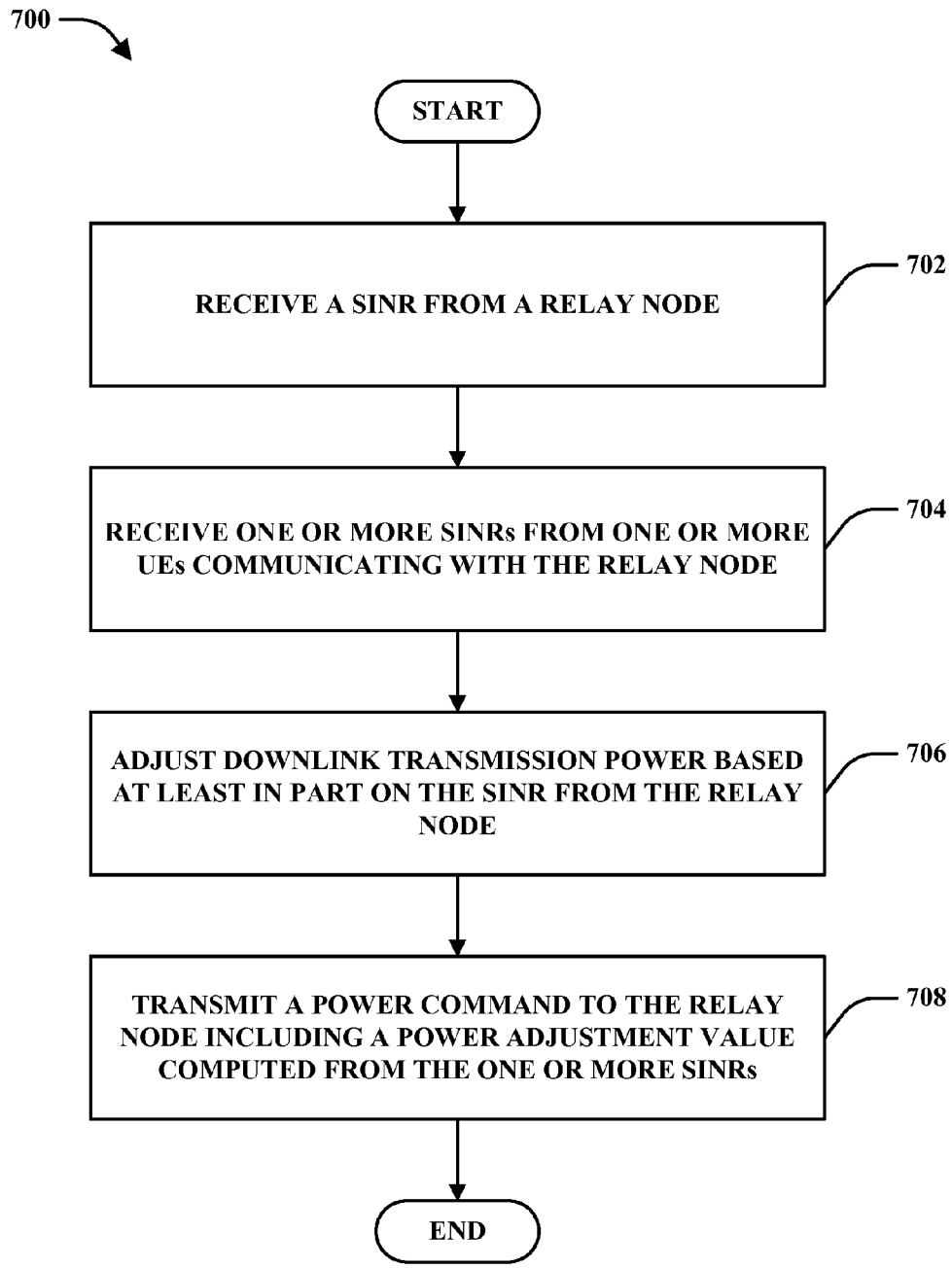
FIG. 7 is a flow diagram of an example methodology that provides end-to-end power control with a relay node.

Referring now to FIGS. 5-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 5, illustrated is an example methodology 500 for adjusting downlink transmission power of one or more relay nodes. At 502, one or more parameters related to one or more UEs communicating with a relay node can be received. As described, the parameters can relate to a load on the relay based on communicating with the one or more UEs, a SINR or similar parameter of the one or more UEs corresponding to communicating with the relay node, and/or the like. At 504, a power adjustment value can be determined for the relay node based at least in part on the one or more parameters. For example, as described, where reported SINRs are below a threshold and/or a load is above a threshold load, an increased power adjustment value can be provided, and a decreased power adjustment value can be provided for load below a threshold and/or SINR above a threshold to conserve power and mitigate co-channel interference, etc. At 506, a power command including the power adjustment value can be transmitted to the relay node. Thus, the relay node can utilize the power adjustment value to modify its downlink transmission power.

Turning now to FIG. 6, an example methodology 600 is shown that facilitates adjusting a transmission power based on a received power adjustment value. At 602, one or more parameters related to communicating with one or more UEs can be provided to an access point. As described, the one or more parameters can include a load related to communicating with the one or more UEs, which can be computed based on one or more parameters described above (e.g., number of UEs, resources allocated to the UEs, etc.), SINR of one or more UEs, which can be forwarded to the access point as part of a provided relay functionality, and/or the like. At 604, a power adjustment value can be received from the access point in response to the one or more parameters. As described, this can be received with data transmissions, in an independent power control message, and/or the like. At 606, a downlink transmission power can be adjusted based at least in part on the power adjustment value.

Referring to FIG. 7, an example methodology 700 that facilitates providing end-to-end power control at a plurality of access points is illustrated. At 702, a SINR can be received from a relay node. As described, the SINR can relate to quality of communications received at the relay node. At 704, one or more SINRs can be received from one or more UEs communicating with the relay node. As described, these SINRs can be received from the UEs directly and/or via the relay node. At 706, downlink transmission power can be adjusted based at least in part on the SINR from the relay node. For example, this can include increasing the downlink transmission power where the SINR is below a threshold, decreasing where the SINR is above a threshold, etc. At 708, a power command can be transmitted to the relay including a power adjustment value computed from the one or more SINRs. In this regard, the relay node can modify its downlink transmission power based on the power adjustment value. Thus, end-to-end power control is provided with the relay node.

It will be appreciated that, in accordance with one or more aspects described herein, inferences can be made regarding determining a power adjustment value based on load, SINR, etc., and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
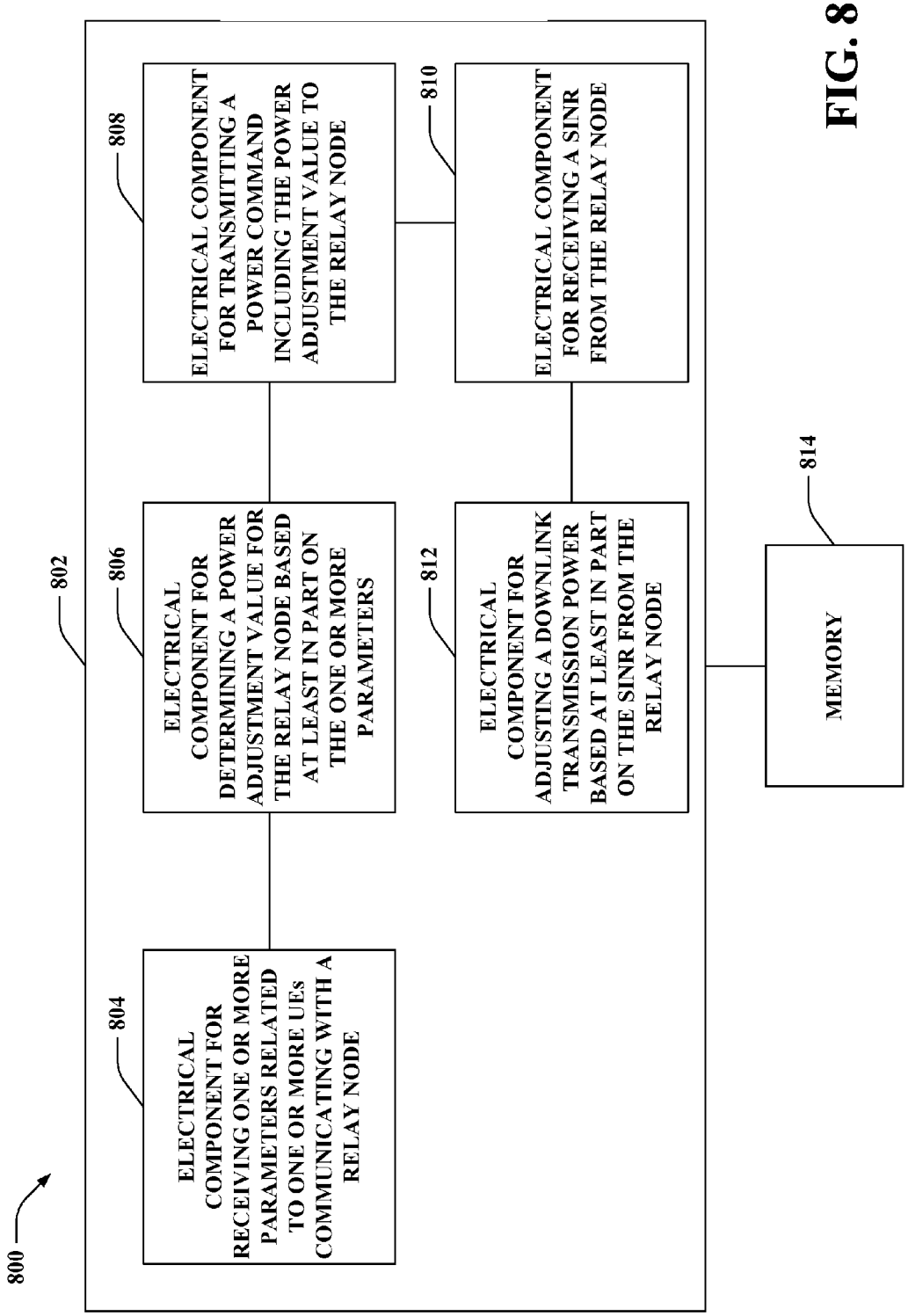
FIG. 8 is a block diagram of an example apparatus that transmits power adjustment values to relay nodes based on reported parameters.

With reference to FIG. 8, illustrated is a system 800 that facilitates adjusting power at a relay node based on received communication parameters. For example, system 800 can reside at least partially within a base station, mobile device, or another device that provides access to a wireless network. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving one or more parameters related to one or more UEs communicating with a relay node 804. As described, the parameters can relate to a load on the relay node, SINR reported from the UEs related to communicating with the relay node, and/or the like. Further, logical grouping 802 can comprise an electrical component for determining a power adjustment value for the relay node based at least in part on the one or more parameters 806.

As described, for example, the power adjustment value can relate to increasing downlink transmission power where the load is above a threshold, the SINR (and/or one or more additional reported SINRs) is below a threshold, etc. Furthermore, logical grouping 802 can include an electrical component for transmitting a power command including the power adjustment value to the relay node 808. Thus, power at the relay node can be controlled based at least in part on the received parameters. Logical grouping 802 can also comprise an electrical component for receiving a SINR from the relay node 810, and an electrical component for adjusting a downlink transmission power based at least in part on the SINR from the relay node 812. Thus, as described, local power can be controlled based on parameters from the relay node as well to provide end-to-end power control. Additionally, system 800 can include a memory 814 that retains instructions for executing functions associated with electrical components 804, 806, 808, 810, and 812. While shown as being external to memory 814, it is to be understood that one or more of electrical components 804, 806, 808, 810, and 812 can exist within memory 814.

Figure 9:
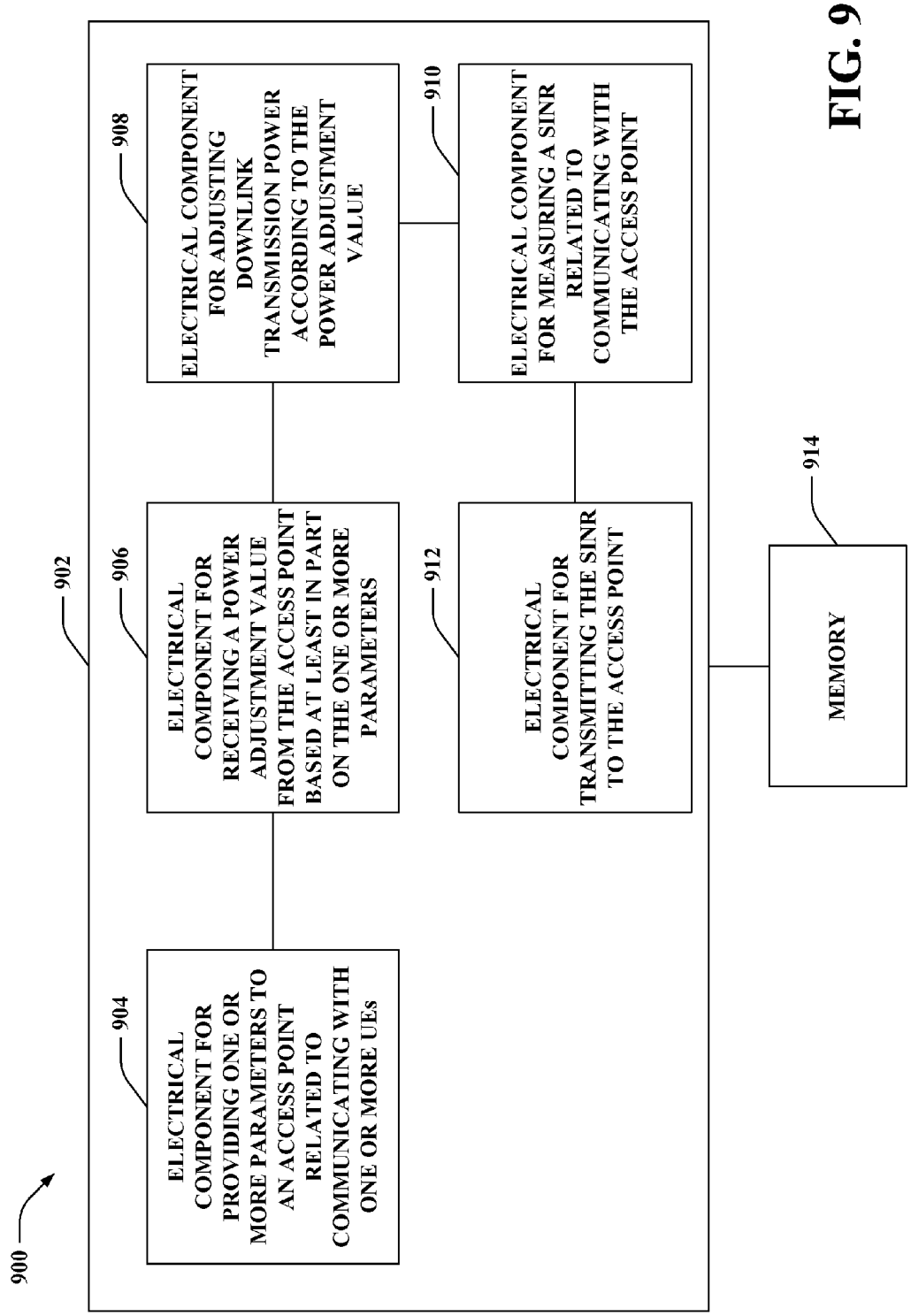
FIG. 9 is a block diagram of an example apparatus that adjusts downlink transmission power based on parameters communicated to an access point.

Now referring to FIG. 9, illustrated is a system 900 that facilitates adjusting downlink transmission power based on receiving a power adjustment value in response to one or more parameters. For example, system 900 can reside at least partially within a base station, mobile device, or another device that provides access to a wireless network. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for providing one or more parameters to an access point related to communicating with one or more UEs 904. As described, the one or more parameters can include a load related to communicating with the one or more UEs, SINR received from the UEs for forwarding to the access point, and/or the like.

Further, logical grouping 902 can comprise an electrical component for receiving a power adjustment value from the access point based at least in part on the one or more parameters 906. Furthermore, logical grouping 902 can include an electrical component for adjusting downlink transmission power according to the power adjustment value 908. Thus, power control is provided based on the reported parameters. Moreover, logical grouping 902 can include an electrical component for measuring a SINR related to communicating with the access point 910, and an electrical component for transmitting the SINR to the access point 912. As described, in this regard, end-to-end power control is provided with the access point. Additionally, system 900 can include a memory 914 that retains instructions for executing functions associated with electrical components 904, 906, 908, 910, and 912. While shown as being external to memory 914, it is to be understood that one or more of electrical components 904, 906, 908, 910, and 912 can exist within memory 914.

Figure 10:
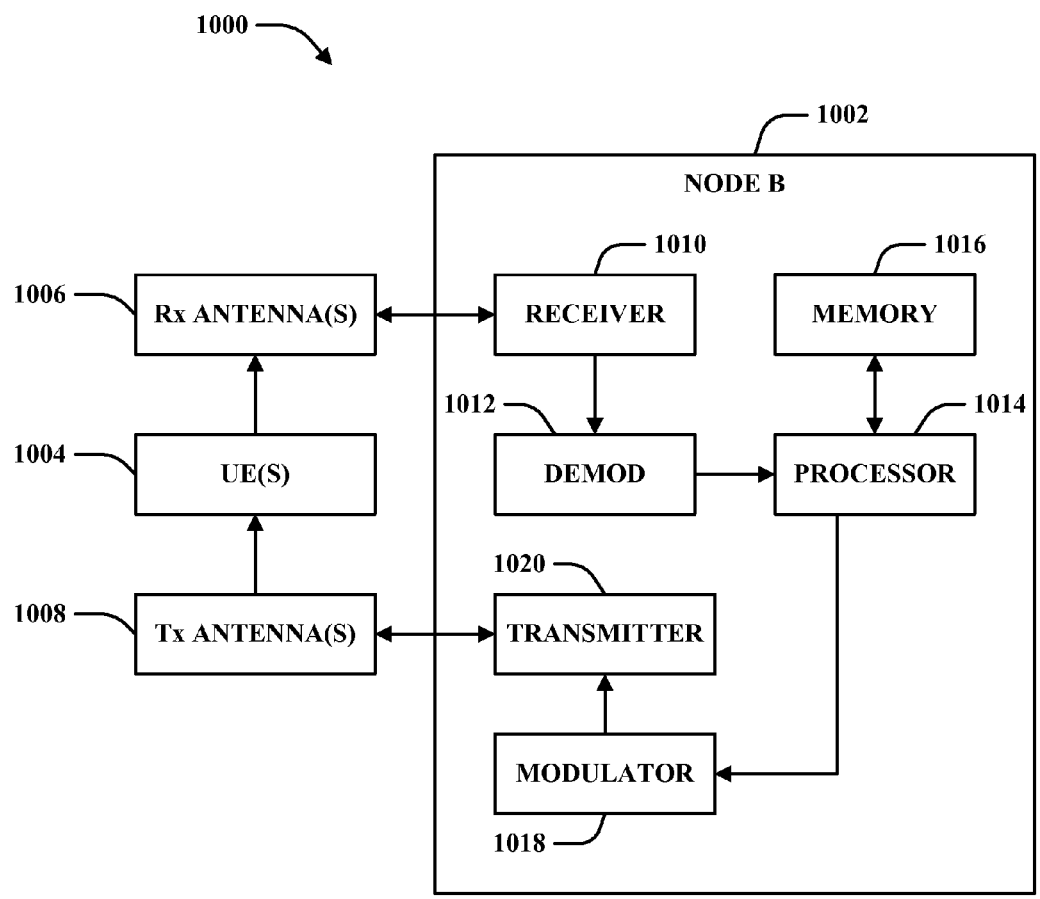
FIGS. 10-11 are block diagrams of example wireless communication devices that can be utilized to implement various aspects of the functionality described herein.

FIG. 10 is a block diagram of a system 1000 that can be utilized to implement various aspects of the functionality described herein. In one example, system 1000 includes a base station or Node B 1002. As illustrated, Node B 1002 can receive signal(s) from one or more UEs 1004 via one or more receive (Rx) antennas 1006 and transmit to the one or more UEs 1004 via one or more transmit (Tx) antennas 1008. Additionally, Node B 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, Node B 1002 can employ processor 1014 to perform methodologies 500, 600, 700, and/or other similar and appropriate methodologies. Node B 1002 can also include a modulator 1018 that can multiplex a signal for transmission by a transmitter 1020 through transmit antenna(s) 1008.

Figure 11:
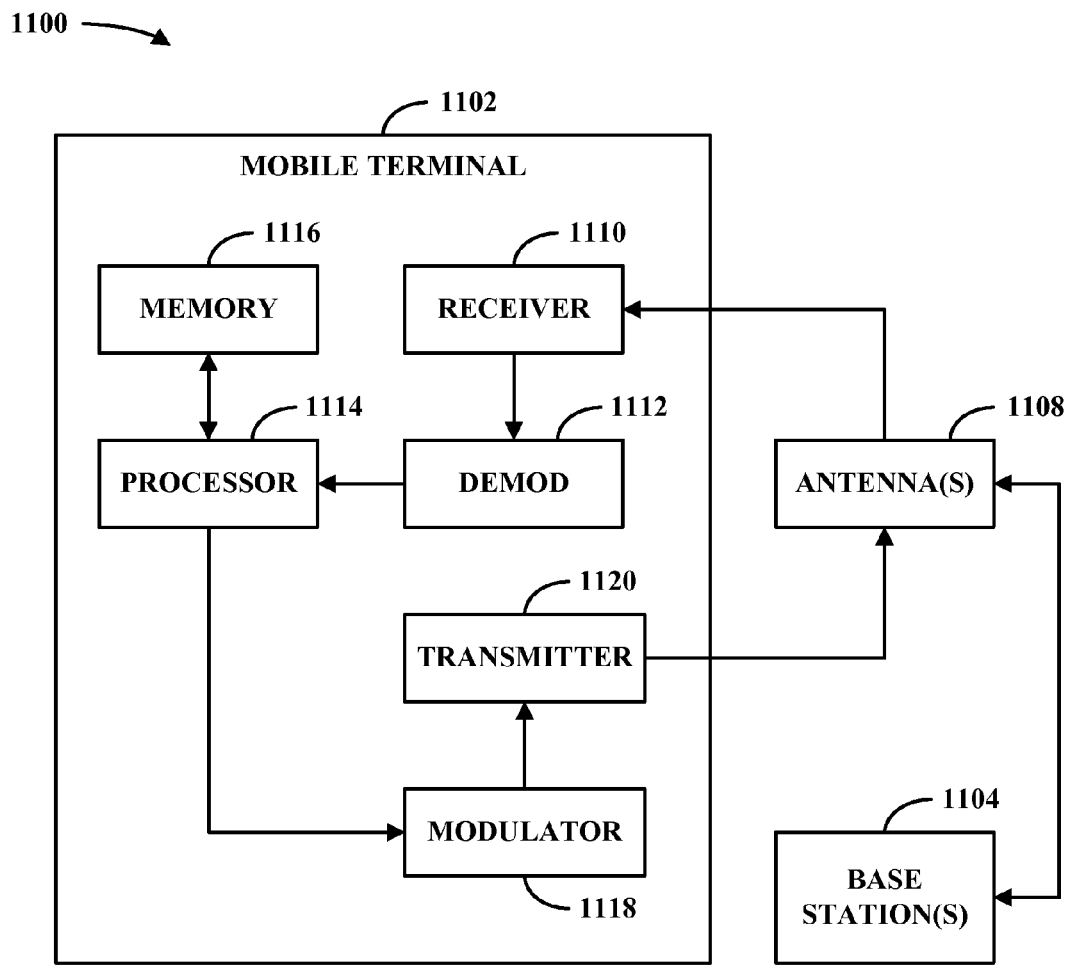

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodologies 500, 600, 700, and/or other similar and appropriate methodologies. Mobile terminal 1102 can also employ one or more components described in previous figures to effectuate the described functionality; in one example, the components can be implemented by the processor 1114. Mobile terminal 1102 can also include a modulator 1118 that can multiplex a signal for transmission by a transmitter 1120 through antenna(s) 1108.

Figure 12:
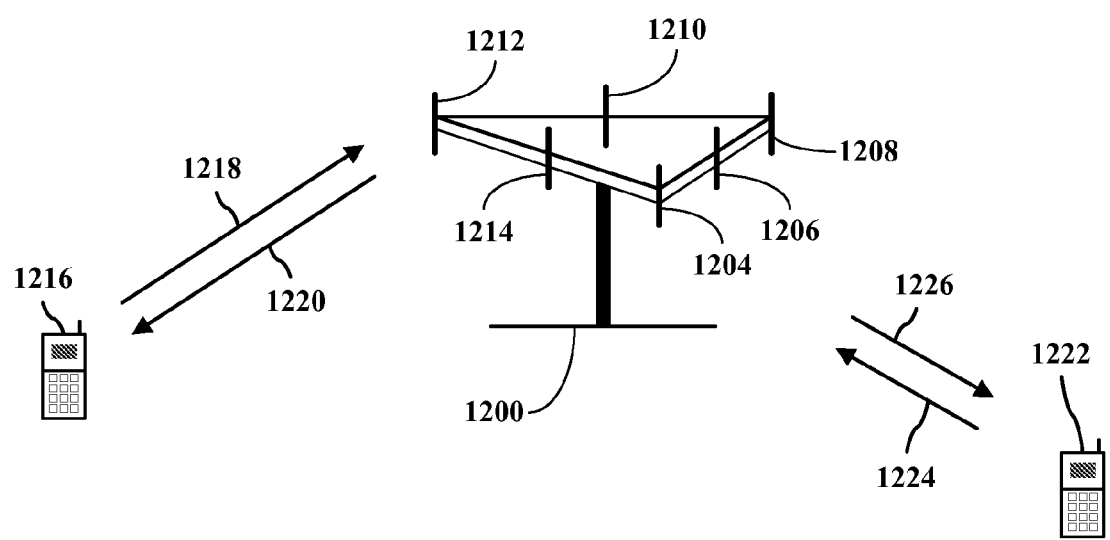
FIG. 12 illustrates an example wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, a Node B, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
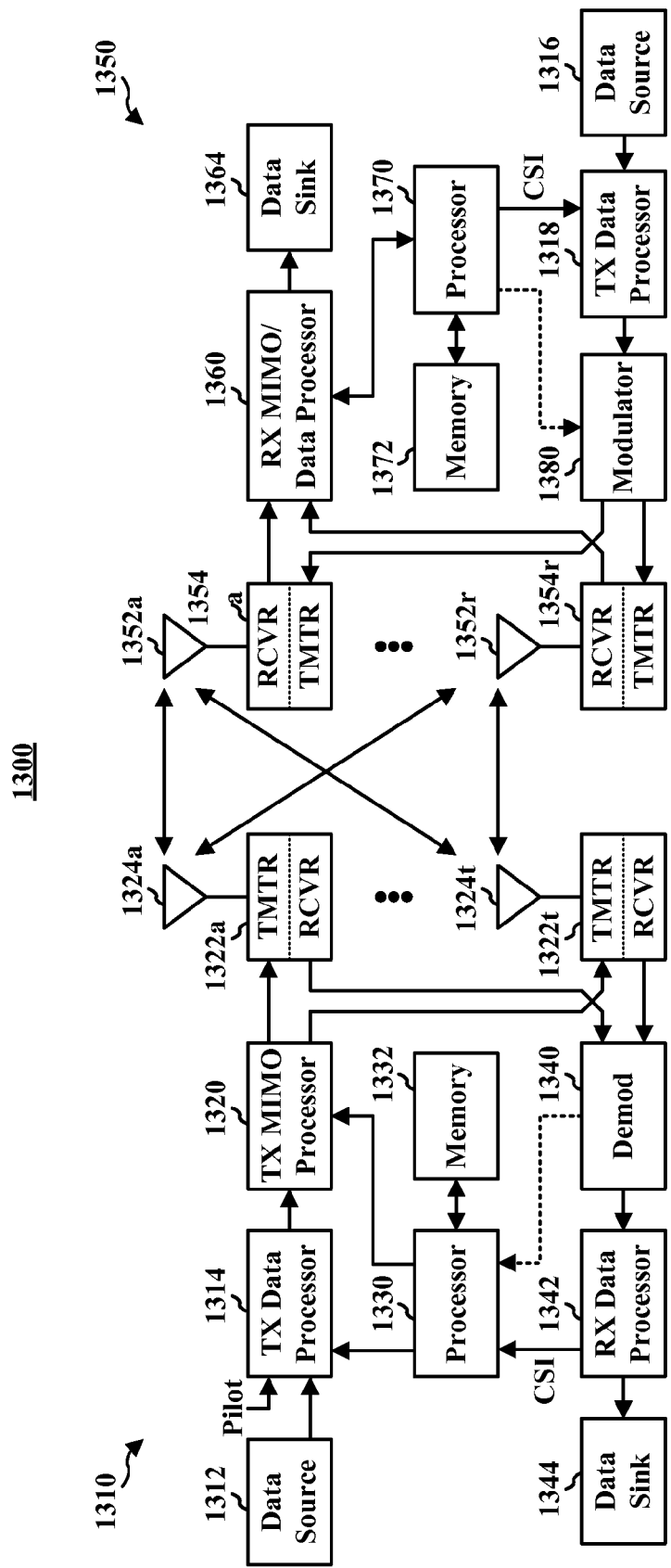
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX MIMO processor 1320, which can further process the modulation symbols (e.g., for OFDM). TX MIMO processor 1320 can then provides $N_T$ modulation symbol streams to $N_T$ transceivers 1322a through 1322t. In one example, each transceiver 1322 can receive and process a respective symbol stream to provide one or more analog signals. Each transceiver 1322 can then further condition (e.g., amplify, filter, and up-convert) the analog signals to provide a modulated signal suitable for transmission over a MIMO channel. Accordingly, $N_T$ modulated signals from transceivers 1322a through 1322t can then be transmitted from $N_T$ antennas 1324a through 1324t, respectively.

In accordance with another aspect, the transmitted modulated signals can be received at receiver system 1350 by $N_R$ antennas 1352a through 1352r. The received signal from each antenna 1352 can then be provided to respective transceivers 1354. In one example, each transceiver 1354 can condition (e.g., filter, amplify, and down-convert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX MIMO/data processor 1360 can then process each symbol stream at least in part by demodulating, deinterleaving, and decoding each detected symbol stream to recover traffic data for a corresponding data stream. Thus, the processing by RX MIMO/data processor 1360 can be complementary to that performed by TX MIMO processor 1320 and TX data processor 1318 at transmitter system 1310. RX MIMO/data processor 1360 can additionally provide processed symbol streams to a data sink 1364.

In accordance with one aspect, the channel response estimate generated by RX MIMO/data processor 1360 can be used to perform space/time processing at the receiver, adjust power levels, change modulation rates or schemes, and/or other appropriate actions. Additionally, RX MIMO/data processor 1360 can further estimate channel characteristics such as, for example, signal-to-noise-and-interference ratios (SNRs) of the detected symbol streams. RX MIMO/data processor 1360 can then provide estimated channel characteristics to a processor 1370. In one example, RX MIMO/data processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
   receiving one or more parameters related to one or more user equipments (UE) communicating with a relay node, wherein the one or more parameters comprise a signal-to-interference-and-noise ratio (SINR) of at least one of the one or more UEs;
   determining a power adjustment value for the relay node based at least in part on the one or more parameters, wherein the determining comprises averaging the SINR of said at least one of the one or more UEs with one or more additional SINRs of one or more different UEs; and
   transmitting a power command including the power adjustment value to the relay node.

2. The method of claim 1, wherein the determining the power adjustment value for the relay node is based at least in part on comparing the SINR to one or more threshold SINR values.

3. The method of claim 1, wherein at least one of the one or more parameters corresponds to a load on the relay node from communicating with the one or more UEs.

4. The method of claim 1, further comprising receiving a signal-to-interference-and-noise ratio (SINR) from the relay node.

5. The method of claim 4, further comprising adjusting downlink transmission power based at least in part on the SINR from the relay node.

6. A wireless communications apparatus, comprising:
   at least one processor configured to:
      obtain one or more parameters for communications between one or more user equipments (UE) and a relay node, wherein the one or more parameters comprise a signal-to-interference-and-noise ratio (SINR) of at least one of the one or more UEs;
      compute a power adjustment value for the relay node based at least in part on the one or more parameters, wherein the computing comprises averaging the SINR of said at least one of the one or more UEs with one or more additional SINRs of one or more different UEs; and
      transmit the power adjustment value to the relay node; and
   a memory coupled to the at least one processor.

7. The wireless communications apparatus of claim 6, wherein the at least one processor computes the power adjustment value based at least in part on comparing the SINR to a threshold SINR.

8. The wireless communications apparatus of claim 6, wherein the one or more parameters relate to a load on the relay node related to communicating with the one or more UEs.

9. The wireless communications apparatus of claim 6, wherein the at least one processor is further configured to:
receive a signal-to-interference-and-noise ratio (SINR) from the relay node;
generate a disparate power adjustment value based at least in part on the SINR; and
adjust a downlink transmission power based at least in part on the disparate power adjustment value.

10. A computer-program product comprising a non-transitory computer-readable medium storing instructions thereon, the instructions being executable by the processor to:
obtain one or more parameters for communications between one or more user equipments (UE) and a relay node, wherein the one or more parameters comprise a signal-to-interference-and-noise ratio (SINR) of at least one of the one or more UEs;
generate a power adjustment value for the relay node based at least in part on the one or more parameters, wherein the generating comprises averaging the SINR of said at least one of the one or more UEs with one or more additional SINRs of one or more different UEs; and
transmit the power adjustment value to the relay node.

11. The computer program product of claim 10, wherein the one or more parameters include a signal-to-interference-and-noise ratio (SINR) related to downlink communications from the relay node at the one or more UEs.

12. The computer program product of claim 11, wherein the instructions to generate the power adjustment value are executable by the processor to generate the power adjustment value based at least in part on comparing the SINR to a threshold SINR.

13. The computer program product of claim 10, wherein the one or more parameters relate to a load on the relay node related to communicating with the one or more UEs.

14. The computer program product of claim 10, wherein the instructions are executable by the processor to:
receive a signal-to-interference-and-noise ratio (SINR) from the relay node;
generate a disparate power adjustment value based at least in part on the SINR; and
adjust a downlink transmission power based at least in part on the disparate power adjustment value.

15. A method, comprising:
providing one or more parameters to an access point related to communicating with one or more user equipments (UE), wherein the one or more parameters comprise a signal-to-interference-and-noise ratio (SINR) of at least one of the one or more UEs;
receiving a power adjustment value from the access point in response to the one or more parameters, wherein the power adjustment value comprises an averaging of the SINR of said at least one of the one or more UEs with one or more additional SINRs of one or more different UEs; and
adjusting a downlink transmission power according to the power adjustment value.

16. The method of claim 15, further comprising determining a load based at least in part on communicating with the one or more UEs, wherein at least one of the one or more parameters relates to the load.

17. The method of claim 15, further comprising:
measuring a signal-to-interference-and-noise ratio (SINR) related to communicating with the access point; and
transmitting the SINR to the access point.

18. A wireless communications apparatus, comprising:
at least one processor configured to:
communicate one or more parameters to an access point related to communicating with one or more user equipments (UE), wherein the one or more parameters comprise a signal-to-interference-and-noise ratio (SINR) of at least one of the one or more UEs;
obtain a power adjustment value from the access point based at least in part on the one or more parameters, wherein the power adjustment value comprises an averaging of the SINR of said at least one of the one or more UEs with one or more additional SINRs of one or more different UEs; and
modify a downlink transmission power according to the power adjustment value; and
a memory coupled to the at least one processor.

19. The wireless communications apparatus of claim 18, wherein the at least one processor is further configured to determine a load based at least in part on the one or more UEs, and the one or more parameters relate to the load.

20. The wireless communications apparatus of claim 18, wherein the at least one processor is further configured to:
determine a signal-to-interference-and-noise ratio (SINR) related to communicating with the access point; and
communicate the SINR to the access point.

21. A computer-program product comprising a non-transitory computer-readable medium storing instructions thereon, the instructions being executable by the processor to:
communicate one or more parameters to an access point related to communicating with one or more user equipments (UE), wherein the one or more parameters comprise a signal-to-interference-and-noise ratio (SINR) of at least one of the one or more UEs;
obtain a power adjustment value from the access point based at least in part on the one or more parameters, wherein the power adjustment value comprises an averaging of the SINR of said at least one of the one or more UEs with one or more additional SINRs of one or more different UEs; and
modify a downlink transmission power according to the power adjustment value.

22. The computer program product of claim 21, wherein the instructions are executable by the processor to:
determine a load based at least in part on the one or more UEs, and the one or more parameters relate to the load.

23. The computer program product of claim 21, wherein the instructions are executable by the processor to:
determine a signal-to-interference-and-noise ratio (SINR) related to communicating with the access point; and
communicate the SINR to the access point.

* * * * *